United States Patent
Schoen et al.

(10) Patent No.: US 11,138,671 B2
(45) Date of Patent: Oct. 5, 2021

(54) ADAPTIVE, SELF-OPTIMIZING, LEVERAGED CAPACITY SYSTEM AND CORRESPONDING METHOD THEREOF

(71) Applicant: Swiss Reinsurance Company Ltd., Zurich (CH)

(72) Inventors: Philip Edward Schoen, Mahopac, NY (US); Alexander Raymond Peck, New York, NY (US); Andreas Schäfli, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 602 days.

(21) Appl. No.: 15/659,250

(22) Filed: Jul. 25, 2017

(65) Prior Publication Data

US 2018/0276759 A1  Sep. 27, 2018

Related U.S. Application Data

(63) Continuation of application No. PCT/EP2017/057223, filed on Mar. 27, 2017.

(51) Int. Cl.
*G06Q 40/08* (2012.01)

(52) U.S. Cl.
CPC .................. *G06Q 40/08* (2013.01)

(58) Field of Classification Search
CPC .................................................. G06Q 40/00
USPC ........................................................ 705/35
See application file for complete search history.

(56) References Cited

U.S. PATENT DOCUMENTS

| | | | | | |
|---|---|---|---|---|---|
| 5,297,032 | A | * | 3/1994 | Trojan | G06Q 40/04 340/4.5 |
| 5,761,442 | A | * | 6/1998 | Barr | G06N 3/0454 705/36 R |
| 5,812,988 | A | * | 9/1998 | Sandretto | G06Q 40/00 702/179 |
| 6,014,645 | A | * | 1/2000 | Cunningham | G06Q 20/363 235/379 |
| 6,058,379 | A | * | 5/2000 | Odom | G06Q 20/10 705/37 |
| 6,313,833 | B1 | * | 11/2001 | Knight | G06F 3/04847 705/35 |
| 6,345,090 | B1 | * | 2/2002 | Walker | G06Q 10/02 379/114.03 |

(Continued)

*Primary Examiner* — Kirsten S Apple
(74) *Attorney, Agent, or Firm* — Oblon, McClelland, Maier & Neustadt, L.L.P.

(57) ABSTRACT

Proposed is an adaptive, layered, automated risk-transfer system and method thereof, with a self-optimizing, increased leveraged capacity and enhanced drop-down cover structure with a plurality of adjustable risk-transfer layers. If a triggered risk-event is assignable to either of the top risk-transfer layer or the bottom risk-transfer layer of the drop-down cover structure, a shared exhaustion factor is generated based on the assigned risk-transfer layer and based on a cover of the loss associated with the triggered risk event. The shared exhaustion factor is applied mutually to both layers by the system eroding both layers by the same exhaustion factor. The top layer and the bottom layer are reinstatable by a corresponding generated normalized reinstatement parameter values normalized over both layers and based on a thus provided shared limit and the erosion of the top layer and the bottom layer.

12 Claims, 3 Drawing Sheets

(56) References Cited

U.S. PATENT DOCUMENTS

| | | | |
|---|---|---|---|
| 6,954,758 B1* | 10/2005 | O'Flaherty | G06Q 30/02 707/802 |
| 7,165,037 B2* | 1/2007 | Lazarus | G06Q 30/02 705/7.31 |
| 7,376,431 B2* | 5/2008 | Niedermeyer | G06Q 20/04 379/114.14 |
| 8,104,678 B2* | 1/2012 | Yoshikawa | G06Q 20/40 235/380 |
| RE43,435 E* | 5/2012 | Krause | G06Q 40/00 |
| 8,234,201 B1* | 7/2012 | Canabarro | G06Q 40/06 705/36 R |
| 8,412,605 B2* | 4/2013 | Griffin | G06Q 40/00 340/5.81 |
| 2002/0103742 A1* | 8/2002 | Billings | G06Q 40/00 705/37 |
| 2002/0161677 A1* | 10/2002 | Zumbach | G06Q 40/00 705/35 |
| 2002/0184134 A1* | 12/2002 | Olsen | G06Q 40/00 705/37 |
| 2003/0149648 A1* | 8/2003 | Olsen | G06Q 40/00 705/35 |
| 2005/0160021 A1* | 7/2005 | Nesmith | G06Q 40/00 705/35 |
| 2005/0187854 A1* | 8/2005 | Cutler | G06Q 40/00 705/37 |
| 2005/0192899 A1* | 9/2005 | Reardon | G06Q 20/10 705/40 |
| 2005/0273412 A1* | 12/2005 | Voudrie | G06Q 40/00 705/36 R |
| 2005/0283423 A1* | 12/2005 | Moser | G06Q 40/00 705/37 |
| 2007/0244795 A1* | 10/2007 | Lutnick | G06Q 40/00 705/37 |
| 2008/0301019 A1* | 12/2008 | Monk | G06Q 20/10 705/35 |
| 2010/0023460 A1* | 1/2010 | Hughes | G06Q 40/06 705/36 R |
| 2010/0312701 A1* | 12/2010 | Bosch | G06Q 20/1085 705/43 |
| 2011/0125672 A1* | 5/2011 | Rosenthal | G06Q 40/04 705/36 R |
| 2011/0145149 A1* | 6/2011 | Valdes | G06Q 20/10 705/44 |
| 2011/0178912 A1* | 7/2011 | Parsons | G06Q 40/00 705/35 |
| 2011/0196809 A1* | 8/2011 | Salomon | G06Q 40/06 705/36 R |
| 2011/0264581 A1* | 10/2011 | Clyne | G06Q 20/10 705/39 |
| 2012/0029956 A1* | 2/2012 | Ghosh | G06Q 10/063 705/7.11 |
| 2012/0278254 A1* | 11/2012 | Rosenthal | G06Q 40/06 705/36 R |
| 2012/0323764 A1* | 12/2012 | Boberski | G06Q 40/00 705/39 |
| 2013/0024349 A1* | 1/2013 | Venkatesan | G06Q 40/04 705/37 |
| 2013/0046673 A1* | 2/2013 | Kiron | G06Q 40/04 705/37 |
| 2013/0110697 A1* | 5/2013 | Duzoglou | G06Q 40/04 705/37 |
| 2013/0226764 A1* | 8/2013 | Battyani | G06Q 40/04 705/37 |
| 2014/0156491 A1* | 6/2014 | Koh | G06Q 40/04 705/37 |
| 2014/0229353 A1* | 8/2014 | Lutnick | G06Q 40/04 705/37 |
| 2014/0229358 A1* | 8/2014 | Kelley | G06Q 40/04 705/37 |

\* cited by examiner

ADAPTIVE, SELF-OPTIMIZING, LEVERAGED CAPACITY SYSTEM AND CORRESPONDING METHOD THEREOF

REFERENCE TO RELATED APPLICATION

The present application is a continuation of PCT International Patent Application No. PCT/EP2017/057223, filed on Mar. 27, 2017, whose disclosure is hereby incorporated by reference in its entirety into the present disclosure.

FIELD OF THE INVENTION

The present invention relates to automated risk transfer systems, in particular self-optimizing and adaptive systems in connection with layered risk-transfer systems having a primary risk-transfer unit and a secondary risk-transfer unit based on a risk-transfer layer structure providing automated an optimized, self-sufficient risk protection of a plurality of risk exposure components. In particular, the present invention relates to layered, automated risk-transfer systems with an increased leveraged capacity and enhanced drop-down cover structure. Even more particular, the invention relates to an event-driven trigger and switching device for the complementary switching of the applied risk-transfer layers and the two coupled risk-transfer systems on the basis of a flexible and adaptable risk transfer structure and operation in order to provide an optimized risk protection with regard to the pooled risk exposure components.

BACKGROUND OF THE INVENTION

Today, self-optimization is an important control principle in adaptive systems. The extension of classical control principles to include autonomous goal redefinition makes it possible to establish intelligence in technical systems. In conjunction with the availability of real time information, this gives the way for the creation of robust and at the same time flexible automation and production systems even in highly dynamic industry and technology environments. The overriding goal is to make machines and equipment more autonomous and more intelligent in order to enhance their flexibility as well as their robustness when exposed to interference factors. Self-optimization as an approach to flexible and reactive automation makes an important contribution in this context. Intelligent assemblies in this mixed-type technology is a classical field of application for self-optimizing and adaptive, electronics-based systems. Due to the fast-developing field and data accessible, there is a high demand for appropriate development of techniques of self-optimization for the assembly of stable operating and high-performance systems. High-precision and predicting operational behavior is one of the crucial technological quality criteria for the assembly of such adaptive systems. It is vital to meet the most exacting demands in terms of data monitoring/capturing, data processing and predicting tolerances. Self-optimizing assembly systems can rise to the challenge by using models to interpret the sensor data or otherwise captured impacting data. This is achieved by drawing on the structural characteristics such as interacting structure and profile of the various functional or structural components, processing quality and speed, predictability and robust behavior of resulting measures in closed control loops in order to correct the individual elements. In a self-optimizing system, tolerance minimization and operational optimization can be replaced or supplemented by function-oriented assembly process control of the various inter-unit and inter-machine interactions. As a result, a robust adaptive system may be maintained and appropriately operated. These steps allow emerging of new technologies and inventions in the field of automation and adaptive systems. The intensification in control of these automated and adaptive process systems in comparison with that achieved in classical applications increases their robustness and therefore their reliability very considerably, even given the rapidly changing parameters in highly flexible long-term and real-time operation.

Catastrophic risks are defined to be risks where a large number of industrial facilities/equipment and/or real estates and/or other value objects and/or people are exposed to the risk of a large loss by reason of the occurrence of a peril. It could be a natural calamity in the form of earthquakes, floods, draughts or even terrorism attack resulting in loss of life, destruction of infrastructure on a large scale. The September 11 attacks on the World Trade Center in New York are examples of catastrophic terrorism attack. Only in the so called 9/11 attacks, 2,974 people died in the attacks. The World Trade Centers completely collapsed. The attacks left a significant economic impact on the United States industry and world markets. Catastrophes have occurred many times in history and will occur in the future at a magnitude that affects and impacts many economies. Large catastrophes can have an adverse impact not only on the industry, economy or public finances but also can impinge on the very subsistence of poor and vulnerable communities. With the passing times, the incidence and severity of catastrophes is increasing. Studies on catastrophes indicated that more than alone in 2008, 2, 38,000 people lost their lives due to the natural catastrophes and man-made disasters—the fourth largest number of deaths since 1970. Catastrophes in 2008 cost the society $225 billion. It includes both insured and uninsured losses to buildings, industrial infrastructure and vehicles. Out of it, $50 billion was covered by property insurance, making 2008 the second costliest year ever in terms of insured losses. The Sichuan earthquake was the costliest at $85 billion. Major catastrophes can put the whole progress of economy at halt. Sock markets plunge, GDP (Gross Domestic Product) growth comes down, the financial strength of the economy weakens and a lot more. Therefore, no industry or economy should ever dare to ignore making sufficient provisions to combat the financial losses of catastrophe. It is clear, that automated reliable and affordable risk-transfer and loss-covering systems against such catastrophic impacts are a great need to industry and economy.

Risk transfer structures and systems are known in the state of the art as a technical tool to manage risks of uncertain losses and ensure the capability of operation of facilities, plants and/or systems during the occurrence of such risk events, in particular to keep up operation of functional, technical or industrial units. These days, significant risk exposure is associated with many aspects in the life and non-life sectors. Risk exposed units, such as any kinds of technical and non-technical objects, individuals, and/or corporate bodies or entities, are necessarily confronted with many forms of active and passive risk management to hedge and protect against the risk of certain losses and events. The prior art addresses such risk of loss, for example, by means of transferring and pooling the risks from a plurality of risk exposed entities to a dedicated pooling entity. In essence, this can be executed by effectively allocating the risks to this pooling unit or entity in that resources of associated units, which are exposed to a certain risk, are pooled. By triggering one of the units 100 be hit by an event that is linked to the transferred risk, the pooling entity directly intercepts the loss or damage caused by the event, for example, by transferring resources from the pooled resources to associated loss recovery units or to the affected unit itself. Pooling of resources can be achieved by exchanging predefined amounts of resources with the resource-pooling system; e.g., payment or premium parameters that are to be paid for the transfer of the risk. This means that in order to keep the pooling system running, the system has to be calibrated in order that the pooled resource amount for the occurring loss.

As described above, automated risk-transfer, i.e. insurance, systems use resource-pooling systems to pool the resources and risks of associated risk exposed components. To avoid operational instabilities, often such resource pooling systems of risk-transfer systems are coupled to one or more further resource pooling systems, wherein redistribute parts of their pooled risks are redistributed to the other supporting system. Correspondingly, a loss that is to be covered can be segmented by appropriate risk-transfer layers using such risk-transfer system coupling, wherein for switching from one risk-transfer system to another risk-transfer system, an optimal risk transfer structure has to be provided by the systems. The issue of providing optimized insurance and/or reinsurance structures is a classical problem of automated risk-transfer systems, since the appropriate use of coupled secondary risk-transfer systems, as, e.g., reinsurance systems, is often an effective risk management tool for managing and mitigating the risk exposure of a primary system and for guaranteeing operational stability and operational best mode practices for a minimal pooling of necessary resources. However, the related effectiveness depends on the choice of the most optimized risk transfer structure. For the prior art systems, the technical problem of optimally coupling risk-transfer systems is often defined and simplified as an issue of optimization; meaning the goal is minimizing the total risk exposure of a risk-transfer system under different boundary criteria, such as, e.g., criteria of value at risk or conditional value at risk, i.e. by finding the optimal balance between the benefit (reducing the risk by purchasing reinsurance layers) and the cost (premiums) of the redistributed risk layers. One of the objects of the present invention is also to address the technical problem of optimized coupling of two layered risk-transfer systems with the goal of pooling the risk exposure of associated components and in seeking better and more effective technical structure on the basis of an appropriate and automatable risk transfer mechanism and corresponding systems.

The prior art specifies a plurality of systems addressing the above-mentioned problem. For example, US 2004/0236698 A1 describes a system for automated risk management trade between two coupled systems: in particular, a first risk-transfer (insurance) system and a coupled second risk-transfer (reinsurance) system. US 2004/0236698 A1 teaches a system for the transfer of premium parameters and loss payment parameters directly between the coupled risk-transfer systems. Further, the system allows for interactions between the two coupled systems, which allows for decision-making functions concerning reinsurance structures. However, US 2004/0236698 A1 does not describe how a loss transfer structure should be realized for a specific system, or how the system should optimize its own risk exposure for the process of determining the mitigation of its own risk. Another example of the known prior art in the field of automated risk transfer systems is US 2011/0112870 A1. US 2011/0112870 A1 discloses a system for determining a percentage for assigning, i.e., transfer-related risk in an insurance pool, wherein the transferred risks are shared via a secondary risk-transfer system that is based on predefined transfer-specific conditions of given reinsurance risk-transfer parameters. The system mainly allows for automatically providing information as to losses, which is transferred to the captive risk-transfer system in first risk-transfer system and second risk-transfer system. However, US 2011/0112870 A1 does not disclose a general method for determining the amount of the actual risk transfer. Still another example of a prior art patent in the field of optimal risk transfer strategies is U.S. Pat. No. 7,970,682 B1. U.S. Pat. No. 7,970,682 B1 discloses a system that automatically provides a primary risk-transfer system's risk transfer structure for the purpose of accommodating the long-standing exposure of liabilities, for achieving significant risk transfer to a third party (reinsurer), for reducing potential financial reporting inconsistencies between hedge assets and liabilities, for less operational risk, and finally for having less exposure to rollover risk (due to changes in the cost of hedging instruments); i.e., in effect, tools for assuring the operational stability of the primary risk-transfer system. U.S. Pat. No. 7,970,682 B1 is not specifically directed at optimizing the risk transfer structures of the pooled risk of a primary resource pooling and risk pooling system; instead, U.S. Pat. No. 7,970,682 B1 is another example for an optimization of the primary risk-transfer system's risk structure. However, nothing in the prior art provides a system for a flexible risk transfer structure, which allows to optimize the various risk-transfer layers to each other, for example in the case of a large events, under inclusion of the technical characteristics of all risk-transfer layers. Further, there is no prior art system allowing automatically maximizing risk protection for small-sized to medium-sized to large-sized events. Typically, event characteristics vary from one risk-transfer layer to another risk-transfer layer and are capturable and/or optimizable only layer-specific by the prior art systems. Moreover, the means for the cover of the different risk layers typically also vary from layer to layer, as for example lower layers may comprise self-retained layers with domestic risk pooling and spreading, middle layer with ex-ante risk cover (as e.g. reserve funds, insurance/reinsurance, CAT bonds, contingent crediting etc.), and upper layer with unprotected cover, since there is often no cost-efficient structure to transfer risks from very extreme events, which makes an overall optimization technically difficult. Thus, there is no prior art system, which allows a transparent optimization of the different risk-transfer layers without comprising the intrinsic disadvantage of possibly surprising system behaviors, for example when triggering the occurrence of a non-industrial loss. Finally, no prior art system allows for automated rating and optimizing of a risk-transfer system's balance strength, operating performance and operating profile, as compared to definable quantitative and/or qualitative operational parameters. The balance strength of an automated risk-transfer system allows to measure the exposure of a system's resource-based surplus to its operating practices and needs. Resource and/or asset leverage can thereby be important in assessing overall balance strength, where the risk-transfer or underwriting leverage is generated form the transferred payment or premium parameters, reinsurance recoverables and loss reserves. In particular, to assess if a risk-transfer systems pooling is balanced and/or optimized a number of measuring parameters are known to have impacts, as for example type of risk-transfer, quality and kind of coupled reinsurance structure, and level of loss reserves.

In summary, in the prior art, existing systems, which operation are at least partially based on risk transfer schemes or structures come in many different forms, wherein they often have very different objectives and operational approaches. However, typically, the range of schemes or structures of the prior art systems are specific to one particular risk-transfer layer and/or risk event types (locality, sector or country), supporting the view that there is no automatable, overall optimizing solution in the prior art. Furthermore, the optimization of the prior art systems is restricted to their structure, upon which they are based on, i.e. either by a proportional or nor-proportional approach of the different layers. Therefore, the optimizations of the prior art systems are technically bound to their chosen risk transfer structure, as proportional or non-proportional and the-like. So, the prior art systems do technically not allow a flexible, completely problem-specific adapted optimization by means of determining an appropriately adapted risk transfer structure, wherein the optimization captures all kind of risk-transfer layers, risk types etc., in particular not by a dynamically or semi-dynamically self-adapted risk transfer structure by means of the systems. Starting from the prior art systems, constructing and assessing the effectiveness and sustainability of a risk transfer structure, particularly in the context of adaptation of complementary coupled systems, is a technical challenge. This goes beyond pure economic cost-benefit analysis, and it needs to include the recognition of the different optimization objectives such as vulnerability reduction, commercial viability, affordability, and the financial sustainability of a scheme in the context of changing risk levels due to optimizing risk transfer structures, but is a technical challenge on the construction a technical basis of such systems, themselves.

SUMMARY OF THE INVENTION

It is one object of the present invention to provide a system and method having an efficient capital adequacy under various rating assessments, as from an A.M. Best perspective, S&P and BCAR, and/or supplying increased earnings protection for occurring risk events. Further, the system shall provide an optimized sharing the risk of risk events of a variable number of risk exposure components by providing dynamic, optimized, layered risk protection for the risk exposure components; this is achieved by means of a primary risk-transfer system, which is stabilized and optimized by an appropriate partial risk transfer to at least one secondary risk transfer system using an optimized risk transfer structure. In particular, the system provides an automated trigger and switching mechanism between the two coupled systems and offers a measure for the optimization of the systems. A further object of the invention seeks to provide a way to technically capture, handle and automate complex, related risk transfer structures and switching operations of the insurance industry that are related to optimally shared risks and transfer operations. Another object of the invention seeks to synchronize and adjust such operations based on technical means. In contrast to standard practice, the resource-pooling systems creates a reproducible operation with the desired, technically based, repetitious accuracy that relies on technical means, process flow and process control/operation.

According to the present invention, these objects are achieved, particularly, with the features of the independent claims. In addition, further advantageous embodiments can be derived from the dependent claims and the related descriptions.

According to the present invention, the above-mentioned objects for a layered, automated risk-transfer system are achieved, particularly, in that a layered risk-transfer system is envisioned that comprising a risk-transfer unit providing an optimized, self-sufficient risk protection for a variable number of risk exposure components by means of an automated resource-pooling system associated with the risk-transfer unit, wherein the risk exposure components are connected to the resource-pooling system by means of a plurality of first payment-transfer modules configured for receiving and storing payments based upon transferred payment transfer parameters from the risk exposure components for the pooling of their risks, and wherein a triggered occurrence of a loss associated with a predefined risk event is distinctively and automatically covered by means of the pooled resources, in that a trigger device comprises a top-down table providing data structures for storing a plurality of adjustable risk transfer layers, each risk transfer layer comprising an assigned start loss layer threshold value and stop loss layer threshold value providing a measure for a defined segmented risk-transfer portion of a risk-transfer continuum of the pooled risk and measurably defining layer-specific risk events and/or layer-specific losses by means of triggerable layer-specific measuring parameters, wherein the top-down table comprises at least a bottom layer and a top layer providing upmost and lowermost layers of risk transferred, in that in case of triggering an occurrence of a risk-event based on measured risk-event measuring parameters, the triggered risk-event is assigned to the corresponding risk-transfer layer based on the start loss and stop loss layer threshold values, wherein a loss associated with the triggered risk event is automatically covered based on the assigned risk-transfer segment by means of the pooled resources of the resource-pooling system, in that if the triggered risk-event is assignable to the top risk-transfer layer the cover is provided by either of the top layer or bottom layer providing a shared limit between the top layer and the bottom layer, elsewise the cover is provided based on the assigned corresponding risk-transfer layer, in that if the triggered risk-event is assignable to either of the top risk-transfer layer or the bottom risk-transfer layer, a shared exhaustion factor is generated based on the assigned risk-transfer layer and based on the cover of the loss associated with the triggered risk event, wherein the shared exhaustion factor is applied mutually to both layers, the bottom and top layer, eroding both layers by the same exhaustion factor, and wherein the top layer and the bottom layer are reinstatable by a corresponding generated reinstatement parameter value normalized over both layers and based on the shared limit and the erosion of the top layer and the bottom layer, and in that elsewise the exhaustion factor is generated based on the assigned risk-transfer layer and based on the cover of the loss associated with the triggered risk event, wherein the generated exhaustion factor is applied only to the assigned layer eroding only the assigned layer by the generated exhaustion factor, and wherein the assigned layer is reinstatable by a corresponding generated reinstatement parameter value based on the erosion of the assigned layer. The reinstatement parameters provide a prorated measure of payment transfer parameters to be transferred from the risk-exposed components to the risk-transfer unit for the reinstatement of the level of primary coverage or reinsurance coverage limit that has been reduced or exhausted by loss coverage under such pooled resources. As a variant, the automated risk-transfer system further comprises an automated secondary risk-transfer unit, wherein resource-pooling system of the risk-transfer unit, as primary risk-transfer unit, is connected to a second resource-pooling system of the secondary risk-transfer unit by means of a second payment-transfer module configured for receiving and storing payments from the resource-pooling system of the primary risk-transfer unit for the transfer of risks associated with the pooled risks of the risk exposure components from the primary risk-transfer unit to the secondary risk-transfer unit, and wherein the automated resource-pooling systems as technical devices are coupled, steered and operated by means of an event-triggered switching device of the system. The risk-transfer system can e.g. comprise a seamless risk transfer provided by the structure of risk transfer layer of the top-down table by means of an assembly module, the risk exposure of the first insurance system associated with the adjustable risk transfer segments of the top-down table is transferred to the secondary risk-transfer system by means of the risk transfer operation, in that, by means of a core engine of the switching device, a payment parameter is assigned to each risk transfer layer of the top-down table and accumulated over all risk transfer layer to a total payment sum, wherein the switching device comprises a capturing device for capturing payment transfer parameters from the first payment-transfer module to the second payment-transfer module, and wherein, upon triggering a transfer of the total payment sum at the second payment-transfer module, the risk exposure of the primary risk-transfer system associated with the risk transfer layers is transferred to the secondary risk-transfer system based on the risk transfer structure provided by means of the assigned risk-transfer layer values, in that the core engine comprises event-driven triggers for the triggering, in a data flow pathway, of measuring devices associated with the risk exposure components for the occurrence of a risk event, wherein the triggers trigger for the occurrence of predefined risk events or stages of the impact of predefined risk events by means of the measuring devices, and wherein in case of a triggering of an occurrence of a risk event in the data flow pathway, the corresponding risk-transfer layer is determined within the top-down table by means of the core engine based on the measured actual loss, and in that, in case of the occurrence of a risk event, an activation signal is generated by means of the switching device based on the determined adjustable risk segment and the measured actual loss, wherein the switching device triggers the complementary activation of the first and second resource-pooling system by means of the generated activation signal by transferring the activation to the first and/or second resource pooling system to provide risk protection to the risk exposure components, wherein the activation of the first and/or second resource pooling system is based on the risk transfer operation the risk-transfer layer values providing threshold values for the complementary switching and activation, and wherein, by means of the generated activation signal based on the determined variable risk-transfer layer of the top-down table, a corresponding trigger-flag, is activated by means of the resource-pooling system, and a parametric transfer of payment is assigned to this corresponding trigger-flag and a loss associated with the occurrence of a risk event is distinctly covered based on the respective trigger-flag. The automated resource-pooling system associated with the primary risk-transfer unit can e.g. be fully automated by means of generated electronic signaling and steering by the risk-transfer system and/or the primary risk-transfer unit. The data structure can, e.g., comprise a parameter indicating the accumulated total payment sum that is required by the primary or secondary risk-transfer unit from the first resource pooling system or the risk-exposure component for transferring the risk corresponding to the defined risk transfer structure by means of the risk-transfer layers. A loss that is associated with the risk event and allocated with a pooled risk exposure component can be, e.g., distinctly covered by the first resource pooling system of the primary risk-transfer unit, such as by means of a transfer of payments from the first resource pooling system to said risk exposure component, and wherein a second transfer of payment from the automated second resource pooling system to the first resource pooling system is automatically triggered by means of the generated activation signal based on the determined variable risk-transfer layer within the top-down table and the measured actual loss of the risk exposure component or the adjustable risk transfer operation provided by the assembly module. However, as an embodied variant, it is also possible that the loss, which corresponds to the risk transferred to the secondary risk-transfer unit as defined by the corresponding risk-transfer layers, is directly covered by the second resource pooling system in that resources are transferred from the second resource pooling system to the concerned risk exposure components. The invention has, inter alia, the advantage that the system provides the technical means for optimizing the coupling and switching of coupled risk-transfer systems, thereby providing an effective risk protection of risk exposed components. The inventive system further allows for an optimized risk transfer structure designed to provide efficient capital adequacy, for example from an A.M. Best (A.M. Best Co. rating system), S&P and BCAR, rating and estimating perspective, and/or supply increased earnings protection for occurring risk events. The A.M. Best Co.'s and S&P's rating systems are able to provide an expert opinion of a risk-transfer's system financial strength and ability to meet ongoing obligations to the risk exposure components (e.g. policyholders). RBC provides the basis of regulatory requirements for US based insurance companies. The assignment of the interactive rating is derived from an evaluation of a risk-transfer's system balance strength or balance-sheet strength, operating performance and processing profile, by comparing these parameters with predefined quantitative and qualitative A.M. Best, S&P and RBC, standard parameters. In determining a risk-transfer system's operational ability to meet and keep up operation for its current and ongoing transferred risks of risk exposure components, the balance strength is important to evaluate, since it is the foundation for the risk-exposed security. The evaluation can be pre-event or post-event. Already here it is to be noted that the present invention does not directly improve the balance sheet of a company pre-event, but only post-event. AM Best and S&P ratings however take into account the degree of CAT exposure in their quantitative models and the inventions does address that. Furthermore, the proposed RBC update effective 2017 or 2018 will also include such an element. For post-events, however it is to be noted, that the present invention improves balance sheet strength directly, as liabilities are reduced. In both cases discussed, the performance then determines how that the balance strength or balance-sheet strength will be enhanced, maintained or eroded over time. The balance strength measures the exposure of a risk-transfer system's surplus to its operative and financial structures. An analysis of a risk-transfer's risk-transfer structure and underwriting, the pooled resources as financial and asset leverages are also important in assessing the overall balance strength. The risk-transfer or underwriting leverage is generated form current risk-transfer operations, secondary risk-transfer system (reinsurance) recoverables and loss reserves. To assess whether a risk-transfer system's underwriting leverage is sufficient, a number of factors unique and specific to the risk-transfer system have to be taken into account, including type of risk-transfer, quality and appropriateness of associated secondary risk-transfer (reinsurance) structures and the adequacy of loss reserves. Thus, the optimized risk-transfer structure of the present invention allows to control and avoid negative rating actions from A.M. Best under BCAR methodology, especially in the generation of Catastrophe PMLs (probable maximum loss) or AAL (annual average loss) at higher VaR (Value at Risk) confidence levels. For the system, the PML is a technically used loss control parameter measuring to the maximum loss expected at a given location in the occurrence of a risk event at that location, for example, expressed of percentage of total measured values or as index parameter measurable in monetary parameters or any other structuring parameters. It further allows to evade operator's or investor's surprises when incurring small to medium sized loss events. The structure of the present invention allows to automatically address both: preserves capital in the case of a large event or provides earnings protection for small- to medium-sized events. The present invention also allows to determine and optimize natural risk break points as well as the mentioned probable maximum loss (PML) and AAL estimates. The invention further allows to assess a new risk-transfer by optimizing the layer structure of this new risk-transfer against its entire portfolio of transferred risks by monitoring how this new risk-transfer impacts its portfolio exposures and aggregations. For example, a risk-transfer system taking over a new risk transfer with heavy wind exposures whose portfolio is already heavily wind exposed will likely charge a higher premium for the shared layers for that new risk-transfer as opposed to a risk-transfer system whose portfolio is less wind risk exposed. The present invention allows for providing a shared limit between a top risk-transfer segment or layer (associated with large events) and a bottom risk-transfer segment or layer (associated with small- to medium-sized event). For all events, the cover provides a recovery from either layer (and for the same event, from only one layer). If either layer is partially eroded, the other position is eroded by the same proportion. Similarly, reinstatement premium factors are dependent upon the erosion of either layer. The reinstatement premium is defined as a proportion of the upfront premium for the cover (e.g. upfront premium 100, reinstatement premium 50 (50%), so if either layer erodes by 25%, the reinstatement premium due is 12.5). This is that the layers possess normalized reinstatement parameter values. For Best's Capital Adequacy Ratio (BCAR) estimation purposes, S&P and RBC: the layer that reduces the required PML the most is the one that's used—generally the upper layer. The invention also allows to provide cover on a multi-year basis with term or annual limits, or on a partially contingent basis and/or combined with an additional trigger which defines whether top or bottom layer yields recoveries for a loss and/or layers with adjust during the term of a cover depending on an exposure index or another index related or unrelated to the underlying exposures. In summary, the inventive system allows to provide efficient capital relief from an A.M. Best perspective and/or supply increased earnings protection from non-industry events. The system allows a much more efficient risk-transfer structure than comparable risk transfer structures of prior art systems, performing each risk-transfer layer, separately, in particular: (i) Reduced Expected Loss: Only recovers from one of the two layers in the same event. (ii) Reduced Expected Shortfall/TailVaR of the combined cover versus each separate combined and therefore increased capital efficiency under an Expected Shortfall/TailVaR economic capital model; and (iii) Minimum ROL Efficiency: Similar to the Top'n'Drop concept, the minimum rate-on-line (ROL) charge is better used by increasing risk (EL) in the structure. In addition, the risk structure is easily adaptable by the primary and/or secondary risk-transfer system to the technical or otherwise individual conditions and requirements thereof. The segmentation by the layered structure allows an optimized adjustment of the risk transfer structure to a specific requirements of the insurance system; i.e., the primary insurance system's risk exposure. Due to the better adjustment of risk transfer structure and/or operation by means of a shared limit, the provided solution can offer the advantages of separate layer risk transfer. The need for optimized risk-transfer system coupling and switching is a typical technical problem in the field of automated risk-transfer technology; and the appropriate use of a risk transfer coupling structure is a necessary requirement for an effective and optimized risk management tool for the purpose of managing and mitigating the primary resource pooling system's risk exposure. However, effectiveness depends on the choice of the most optimized risk transfer structure, which is also implemented in the context of the present switching functionality. The invention provides supremely optimized coupling based on the classically prevalent interest of managing the two coupled risk transfer systems, seeking better and more effective operation and strategies based on an appropriate risk transfer structure. The system has, furthermore, the advantage that smaller pooled resources, in contrast to traditional coupled resource pooling systems, are sufficient to allow for a safe operation of the system. In addition, the operational aspects of the system are transparent to operators as well as covered risk units, since payment is transferred in response to individually adaptable risk transfer structures and related to certain definable triggers in the context of the information pathways. Finally, the inventive system provides a new modality for optimizing the underlying risk transfer structure in the service of risk transfer and sharing of two coupled insurance systems by using several layers of shared limits.

In one embodied variant, if the bottom risk-transfer layer is partially eroded by means of the generated exhaustion factor, the top risk-transfer layer is eroded by the same proportion, whereas if the top risk-transfer layer is partially eroded by means of the generated exhaustion factor, the bottom risk-transfer segment is utilized until a recovery from the top layer exceeds the shared limit of the lower layer less the reinstatement premium parameters, factoring in remaining limit. This embodiment variant has inter alia the advantage that the reinstatement premium is a function of proportion of layer exhaustion. For example, if the risk-exposure component has a 150 m loss, the top layer is eroded by 50%, so the reinstatement premium is generated as: 50%*6 m=3 m. After this loss 50% of the reinstatement remains.

It is an important advantage that the present invention allows to provide a leveraged capacity which is inter alia engineered in order to cope with the AM Best BCAR model, S&P and RBC, and rating and subsequent need for risk-transfer systems for increased CAT capacity. The invention is set out to develop a structure that provides an improved efficiency versus purchasing an additional layer on stand-alone basis. The result is an enhancement of a drop-down cover, whereby the limit of the top-layer is significantly larger than that of the bottom and in a single event the risk-exposure component or individual can only recover from either layer. The risk exposed component or individual can however choose for each event which layer is applicable, or alternatively, the system automatically chooses the optimal layer thereby optimizing automatically the risk-transfer structure. Typically, the bottom-layer would be the first layer of an existing CAT risk-transfer layer tower, the top-layer would be the top-layer of the structure and ratio of limits could be, for example, in the magnitude of between 1:5 to 1:30. An element which makes this structure inter alia so unique is, that the inventive system provides operation by means of "normalized" reinstatement parameters. Given that the bottom layer could, within a reasonable probability attach multiple times in a year, a risk exposed individual would only be interested in using such a structure with a number of reinstatements. The number of reinstatements are shared between both layers. A partial erosion of one of the layers reduces automatically the number of available reinstatements post-event by the proportion of erosion of the layer. (E.g.: After an event with a 30% erosion of the lower-layer on a structure with 2 reinstatements and post-event 1.7 reinstatements are available for both layers going forward.) Furthermore, the risk-exposure component will be required to pay a reinstatement premium which is proportional to the erosion of layer (E.g. 30% erosion of the top-layer, the reinstatement premium is 30% of the upfront premium).

In another embodied variant, the recovery is automatically maximized by ordering events in a descending order, providing an optimized risk-transfer structure with a total maximum recovery from multiple events in the same time period. This embodiment variant has inter alia the advantage that it takes into account that the order of events does make a difference in the present inventive risk-transfer system and structure. If a large event happens first, then the risk-exposure component can get higher recoveries than if these happen after a few smaller events. Thus, recovery can be maximized by ordering events in a descending order, thus allowing the risk-exposure component the total maximum recovery from multiple events in the same year and thereby taking out any uncertainty.

In a further embodied variant, the risk transfer operation is comprised of the plurality of stored, variable risk transfer layers, wherein the resource pooling system of the primary risk transfer unit comprises an interface module for accessing and adapting the assigned risk-transfer layer value of each of the risk transfer layers prior to the transfer of the payment sum to the resource pooling system. This embodied variant has, inter alia, the advantage that the risk transfer structure can be dynamically adjusted and, moreover, selected and/or optimized directly by the first resource pooling system or the associated insurance system.

In still another embodied variant, the assembly module of the switching device comprises means for processing risk-related component data and for providing data as to the likelihood of said risk exposure for one or a plurality of the pooled risk exposure components, in particular, based on risk-related component data, and wherein the receipt and preconditioned storage of payments from risk exposure components for the pooling of their risks can be dynamically determined based on the total risk and/or the likelihood of risk exposure of the pooled risk exposure components. This embodied variant has, inter alia, the advantage that the operation of the first and/or second resource-pooling system can be dynamically adjusted to changing conditions in relation to the pooled risk, as, for example, a change of the environmental conditions or risk distribution, or the like, of the pooled risk components. A further advantage is that the system does not require any manual adjustments, when it is operated in different environments, places or countries, because the size of the payments of the risk exposure components is directly related to the total pooled risk.

In one embodied variant, the assembly module of the switching device comprises means for processing risk-related component data and for providing information as to the likelihood of said risk exposure for one or a plurality of the pooled risk exposure components, in particular, based on risk-related component data, and wherein the receipt and preconditioned storage of payments to the resource pooling system for the transfer of its risk can be dynamically determined based on the total risk and/or the likelihood of risk exposure of the pooled risk exposure components. This embodied variant has, inter alia, the advantage that the operation of the primary and/or secondary risk-transfer unit can be dynamically adjusted to changing conditions of the pooled risk, as, for example, changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one embodied variant, the number of pooled risk exposure components is dynamically adjusted by means of the resource-pooling system to a range where non-covariant, occurring risks covered by the resource-pooling system affect only a relatively small proportion of the total pooled risk exposure components at any given time. Analogously, in the variant with two resource-pooling systems the second resource pooling system can, e.g., dynamically adjust the number of pooled risk shares transferred from first resource pooling systems to a range where non-covariant, occurring risks covered by the second resource-pooling system affect only a relatively small proportion of the total pooled risk transfers from first resource pooling systems at any given time. This variant has, inter alia, the advantage that the operational and financial stability of the system can be improved.

In one embodied variant, the risk event triggers are dynamically adjusted by means of an operating module based on time-correlated incidence data for one or a plurality of risk events. This embodied variant has, inter alia, the advantage that improvements in capturing risk events or avoiding the occurrence of such events, e.g. by improved forecasting systems etc., can be dynamically captured by the system and dynamically affect the overall operation of the system based on the total risk of the pooled risk exposure components.

In another embodied variant, upon each triggering of an occurrence, where parameters indicating a risk event are measured, by means of at least one risk event trigger, a total parametric payment is allocated with the triggering, and wherein the total allocated payment is transferrable upon a triggering of the occurrence. The predefined total payments can, e.g., be leveled to any appropriate lump sum, such as, for example, a predefined value, or any other sum related to the total transferred risk and the amount of the periodic payments of the risk exposure component. This variant, inter alia, has the advantage that the parametric payments or the payments of predefined amounts, which, as in the embodied variant, may also depend on a first, second, third or a plurality of trigger levels, i.e. the different stages of triggers, and allow for an adjusted payment of the total sum that can, e.g., be dependent on the stage of the occurrence of a risk event, as triggered by the system.

In one embodied variant, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable by means of the monitoring module. As a variant, the request for periodic payment transfer can be interrupted automatically or waived by means of the monitoring module, when the occurrence of indicators for a risk event is triggered in the data flow pathway of a risk exposure component. These embodied variants have, inter alia, the advantage that the system allows for further automation of the monitoring operation, especially of its operation with regard to the pooled resources.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
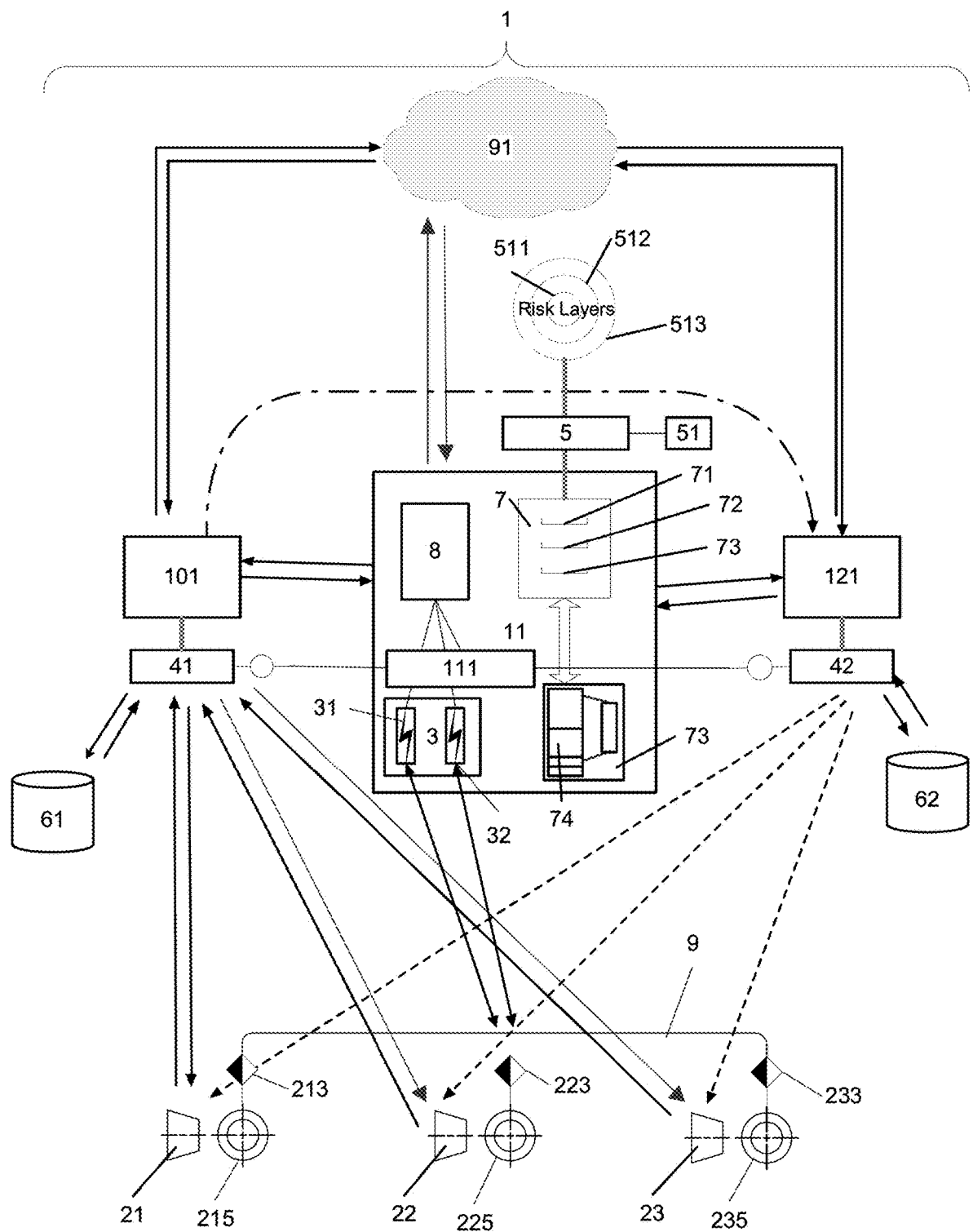
FIG. 1 shows a block diagram illustrating schematically an exemplary system 1 with an event-triggered switching device 11 for complementary switching of coupled risk-transfer units 10/12 by providing a self-sufficient risk protection of a variable number of risk exposure components 21, 22, 23 by means of two automated resource-pooling systems 101, 121. The switching device 11 comprises an adaptable top-down table 7 providing data structures 711, ..., 71$t$ for storing a plurality of adjustable risk transfer layers or risk segments 721, ..., 72$t$ with a shared limit comprising an assigned layer threshold values 7211, ..., 72$t$1/7212, ..., 72$t$2, wherein an adaptable risk transfer operation 73 is provided by the structure 74 of the risk-transfer segments 721, ..., 72$t$.
Figure 2:
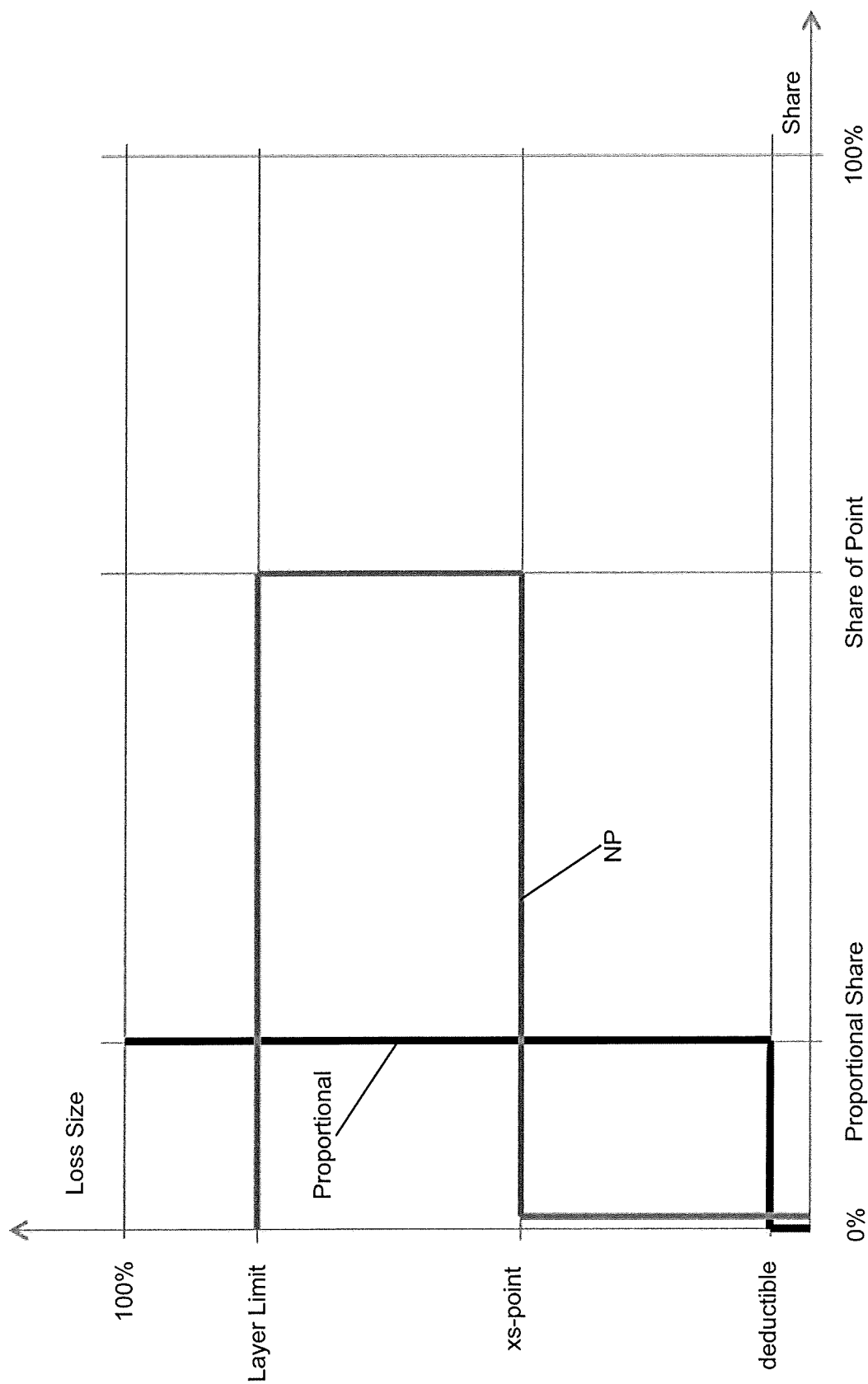
FIG. 2 shows a block diagram illustrating schematically the coupling structure of prior art systems using either a proportional or non-proportional switching structure.
Figure 3:
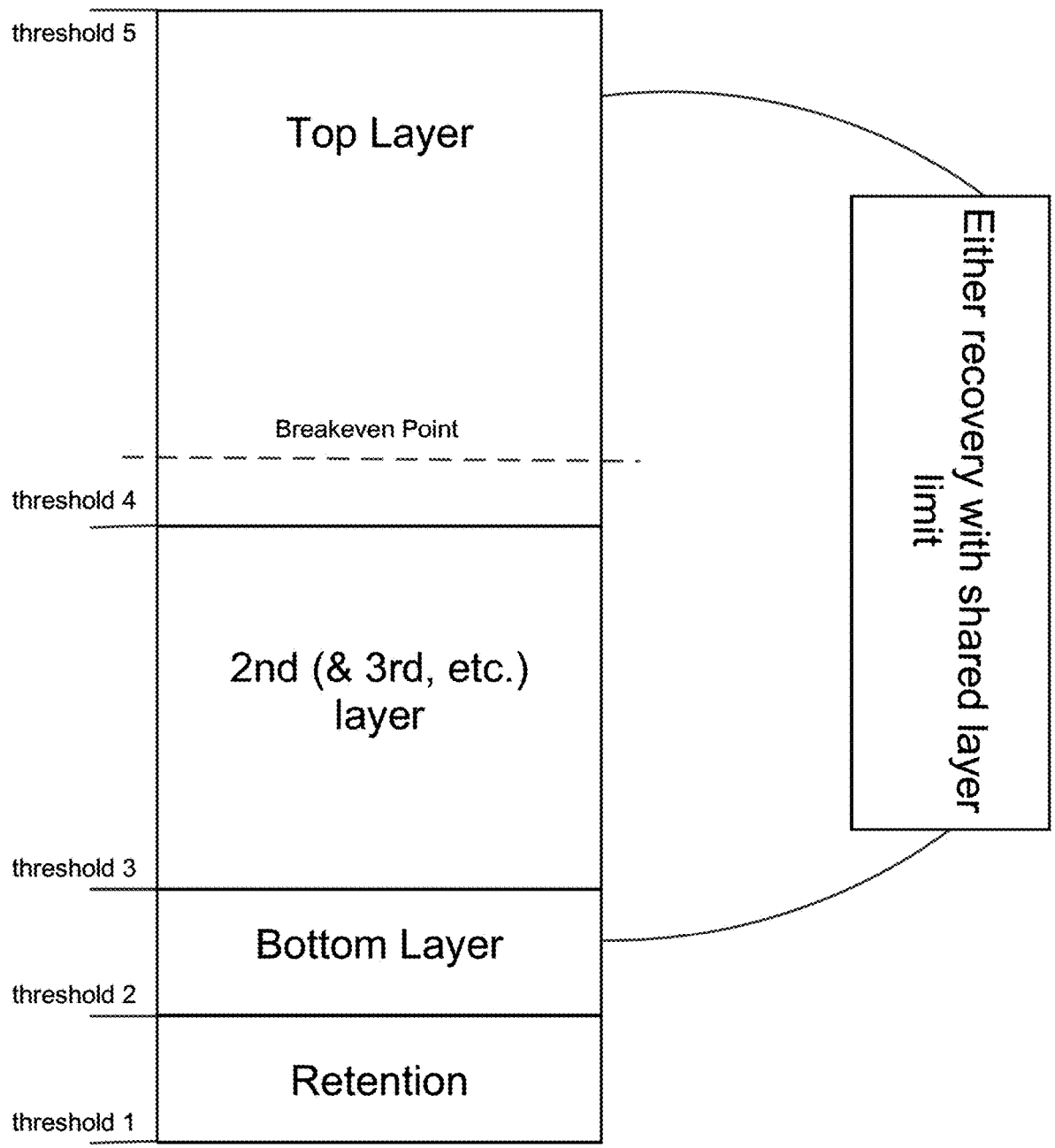
FIG. 3 shows a structural diagram illustrating schematically the adaptive risk-transfer segment 721 ..., , 72$t$ structure with the shared limit. If the lower layer is partially eroded, the top layer is eroded by same proportion. If the upper layer is partially eroded, the lower layer is utilized until the recovery from the top layer exceeds the limit of the lower layer less the reinstatement premium, factoring in remaining limit. For example, in FIG. 3, threshold 5 could be 200 m with 1 in 200 year RP (Return Period), threshold 4 100 m with 1 in 100 year RP, threshold 3 20 m with 1 in 10 year RP, threshold 2 10 m with 1 in 5 year RP and threshold 1 simply 0. Thus, if layers are assumed to be paced at 100%, for the top risk-transfer layer 51$t$ the inventive structure gives 100 m×100 m with 3% Rate On Line (ROL, i.e. percentage of the specified limit)=cost of 3 m, for the $2^{nd}$ risk-transfer layer 512 it gives 80 m×20 m, and for the bottom risk-transfer layer 511 it gives 10 m×10 m with 30% ROL=cost of 3 m. The erosion is applied to either layer for a total cost of <6 m, wherein <6=2×3 m premium−3 m*P (Attachment Top Layer)/P(Exceedance Lower Layer). The breakeven point (dotted line on FIG. 3) is the theoretical point above which the risk exposure component, unit or individual 21, 22, 23, 24 would benefit more from taking a loss from the top layer than from the bottom layer. It's the point equivalent to the limit of the bottom layer less the reinstatement premium, above the attachment point of the top layer (e.g., (10 m−3 m)+100 m=~107 m). The breakeven point has no bearing on the pricing or structuring of the layers, but can be used as a point of reference for the risk-exposure components 21, 22, 23, 24.

FIG. 1 illustrates, schematically, an architecture for a possible implementation of an embodiment of the system 1 for a layered, automated risk-transfer structure comprising a shared limit between a top 72$t$ and bottom 72$l$ risk transfer layer or risk-transfer segment. The system 1 can comprise an event-triggered switching or trigger device 11 for complementary switching of two coupled risk-transfer units 10/12 by providing self-sufficient risk protection of a variable number of risk exposure components 21, 22, 23 by means of two automated resource-pooling systems 101, 121 that are associated with automated insurance systems. In FIG. 1, reference numeral 1 refers to a system for providing optimized risk protection related to risk exposure components 21, 22, 23 ... with the associated coupled risk-transfer units 10, 12. The resource-pooling systems 101, 121, which are coupled, steered and/or operated by means of the trigger device 11, provide dynamic self-sufficient risk protection and a corresponding risk protection structure for the variable number of risk exposure components 21, 22, 23; i.e., units or individuals exposed to defined risk events 52. As an embodiment variant, the risk exposure components 21, 22, 23 are automated first insurance systems and the risk-transfer unit 10 is an automated reinsurance system, wherein a portion of the risk accumulated by an automated first insurance system is transferred to the automated reinsurance system by system 1 and captured by the risk transfer layers 721, 722, 723, ..., 72$i$, ..., 72$t$, and wherein a portion of the risk is retained and assigned to a retention layer of the automated first insurance system. The occurrence of such risk events 52 is measurable and triggerable by means of appropriate measuring devices and/or trigger modules triggering in the data flow pathway of output data; i.e., measuring parameters 521, ..., 523 of the measuring devices 215, 225, 235. The system 1 can include at least one processor and associated memory modules. The system 1 can also include one or more display units and operating elements, such as a keyboard and/or graphic pointing devices. The resource-pooling systems 101 and 121 are technical devices comprising electronic means that can be used by service providers in the field of automated risk transfer or insurance technology for the purpose of risk transfer as it relates to the occurrence of measurable risk events 52. The invention seeks to capture, handle and automate by technical means complex related operations of the automated risk-transfer/insurance systems, in particular in an effort of optimizing the risk-transfer and the interaction of coupled primary and secondary risk-transfer units 10/12, and to reduce the operational requirements. Another aspect that is addressed is finding ways to synchronize and adjust such operations related to inside coupling or switching of two resource pooling systems 101/121, which are directed at proved risk protection of risk exposed components 21, 22, 23 based on technical means, or to synchronize and adjust such operations related to risk-transfer coupling or switching of a resource pooling systems 101 with the plurality of risk exposed components 21, 22, 23. In contrast to the standard practice, the resource-pooling systems 101/121 also achieve reproducible, dynamically adjustable operations with the desired technical, repeating accuracy, because it is completely based on technical means, a process flow and process control/operation.

The trigger device 11 and/or the resource-pooling systems 101 and 121 comprise an assembly module 5 for processing risk-related component data 211, 221, 231 and for providing the likelihood 212, 222, 232 of said risk exposure for one or a plurality of the pooled risk exposure components 21, 22, 23, etc. based on the risk-related component data 211, 221, 231. The resource-pooling systems 101 and/or 121 as well as the trigger device 11 can be implemented as a technical platform, which is developed and implemented to provide risk transfer through a plurality of (but at least one) payment transfer modules 41 and 42. The risk exposed components 21, 22, 23, etc. are connected to the resource-pooling system 101 respectively to the risk-transfer unit 10 by means of the plurality of payment transfer modules 41 that are configured to receive and store payment parameters 214, 224, 234 in a payment data store 61 from the risk exposed components 21, 22, 23 for the pooling of their risks. The storage of the payments can be implemented by transferring and storing component-specific payment parameters. The payment amount can be determined dynamically by means of the resource-pooling system 101 based on total risk of the overall pooled risk exposure components 21, 22, 23. For the pooling of the resources, the system 1 can comprise a monitoring module 8 that requests a periodic payment transfer from the risk exposure components 21, 22, 23, etc. to the resource-pooling system 1 by means of the payment transfer module 41, wherein the risk protection for the risk exposure components 21, 22, 23 is interrupted by the monitoring module 8, when the periodic transfer is no longer detectable by means of the monitoring module 8. In one embodied variant, the request for periodic payment transfers is automatically interrupted or waived by means of the monitoring module 8, when the occurrence of indicators for risk event is triggered in the data flow pathway of a risk exposure component 21, 22, 23. Analogously, the first resource-pooling system 101 of the risk-transfer unit 10 can be connected to a second resource-pooling system 121 of a secondary risk-transfer unit 12 by means of a second payment-transfer module 42 that is configured for receiving and storing payments from the resource-pooling system 101 of the primary risk-transfer unit 10 for the transfer of risks associated with the pooled risks 50 of the risk exposed components 21, 22, 23 from the primary risk-transfer unit 10 to the secondary risk-transfer unit 12 as automated reinsurance system. The coupling and switching of the two complementary, autonomously operated resource pooling systems 101, 121 can be achieved by the event-triggered trigger device 11 for generating and transmitting appropriate steering signals to the primary and secondary risk-transfer units 10, 12.

As indicated in FIG. 1, the system 1 includes a data storing module for capturing the risk-related component data and multiple functional modules; e.g., namely the payment transfer modules 41 and 42, the core engine 3 with the risk event triggers 31, 32, the assembly module 5 or the operating module 30. The functional modules can be implemented at least partly as programmed software modules stored on a computer readable medium, connected as fixed or removable to the processor(s) of system 1 or to associated automated systems. One skilled in the art understands, however, that the functional modules can also be implemented fully by means of hardware components, units and/or appropriately implemented modules. As illustrated in FIG. 1, system 1 and its components, in particular the first and second resource pooling systems 101, 121, the switching or trigger device 11, the trigger modules 31,32, the measuring devices 215, 225, 235 with the interfaces 213, 223, 232, the assembly module 5, and the payment transfer modules 41, 42, can be connected via a network 91, such as a telecommunications network. The network 91 can include a hard-wired or wireless network; e.g., the Internet, a GSM network (Global System for Mobile Communication), an UMTS network (Universal Mobile Telecommunications System) and/or a WLAN (Wireless Local Region Network), and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource-pooling systems 101, 121 comprise, furthermore, all the necessary technical means for electronic money transfer and link-up association; e.g., as initiated by one or more associated payment transfer modules 41, 42 via an electronic network. In this case, the monetary parameters as transferred payment transfer parameters, used for receiving and storing payments by the system 1, can be based on any possible electronic and transfer means, such as, e.g., e-currency, e-money, electronic cash, electronic currency, digital money, digital cash, digital currency, or cyber currency etc., which can only be exchanged electronically. The first and second payment data stores 61, 62 provide the means for associating and storing monetary parameters associated with a single of the pooled risk exposure components 21, 22, 23. The present invention can involve the use of the mentioned networks, such as, e.g., computer networks or telecommunication networks, and/or the internet and digital stored value systems. Electronic funds transfer (EFT), direct deposit, digital gold currency and virtual currency are further examples of electronic money modalities. Also, transfers can involve technologies such as financial cryptography and technologies for enabling such transfers. For the transaction of the monetary parameters, it is preferable that hard electronic currency is used, without the technical possibilities for disputing or reversing charges. The resource-pooling systems 101, 121 support, for example, non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the units 10, 12. This means that using hard electronic currency is rather akin to a cash transaction. However, also conceivable is the use of soft electronic currency, such as currency that allows for the reversal of payments, for example having a "clearing time" of 72 hours, or the like. The way of the electronic monetary parameter exchange applies to all connected systems, modules and units related to the resource-pooling systems 101, 121 of the present invention, such as, e.g., the first and second payment transfer modules 41, 42. The monetary parameter transfer to the first and second resource-pooling system 101, 121 can be initiated by a payment-transfer module 41 rsp. 42 or upon request by the related resource-pooling system 101 or 121.

The system 1 comprises an event-driven core engine 3 comprising risk event triggers 31, 32 for triggering component-specific measuring parameters in the data flow pathway 213, 223, 233 of the assigned risk exposure components 21, 22, 23. The data flow pathway 213, 223, 233 can, e.g., be monitored by the system by means of measuring devices 215, 225, 235 that are connected to a data flow pathway 9 via the interfaces 213, 223, 233; in particular, it can be monitored by the risk-transfer systems 10 and/or 12 and/or the trigger device 11, thereby capturing component-related measuring parameters of the data flow pathway 213, 223, 233 at least periodically and/or within predefined time periods. According to an embodied variant, the data flow pathway 213, 223, 233 can, for example, also be dynamically monitored by the system 1, such as by triggering component-measuring parameters of the data flow pathway 213, 223, 233 that are transmitted from associated measuring systems 215, 225, 235. Triggering the data flow pathway 213, 223, 233, which comprises dynamically recorded measuring parameters of the concerned risk exposed components 21, 22, 23, the system 1 is able to detect the occurrence of predefined risk events based on predefined trigger parameters. Further, the system 1 can, e.g., also dynamically monitor different stages during the progress of the impact of a risk event on the risk exposure component 21, 22, 23 in order to provide appropriately adapted and gradated risk protection for a specific risk exposed component 21, 22, 23. Such a risk protection structure is based on received and stored payments 214, 224, 234 from the related risk exposed component 21, 22, 23 and/or related to the total risk 50 of the risk-transfer unit 10, based on the overall transferred risks of all pooled risk exposed components 21, 22, 23.

The trigger or switching device 11 comprises a top-down table 7, e.g. realized as a searchable, hierarchically structured data hash table. The top-down table 7 provides hierarchical data structures 711, . . . , 71t for storing a plurality of variable risk transfer layers 721, . . . , 72t by means of assigned start loss segment threshold values 7211, . . . , 72t1 and stop loss layer threshold values 7212, . . . , 72t2. In this way, the i-th variable risk transfer layer 72i comprises the i-th measure for a part of a segmented layer, i.e. a part of the i-th risk contribution, of the total pooled risk 50. By means of the measures of the parts of the segmented risk layers of the pooled risk, an adjustable risk transfer operation 73 can be realized providing the structure 74 of the plurality of adjustable risk transfer layers 721, . . . , 72t by means of the assembly module 5. As mentioned, the top-down table 7 of the trigger device 11 provides data structures 711, . . . , 71t for storing a plurality of adjustable risk transfer layers 721, . . . , 72t. Each risk transfer layer 721, . . . , 72t comprising an assigned start loss layer threshold value 7211, . . . , 72t11 and stop loss layer threshold value 7212, . . . , 72t2 providing a measure for a defined risk-transfer portion 511, . . . , 51t segmented from the risk-transfer continuum of the pooled risk 50 and providing classifiable measurability for layer-specific risk events 52 and/or layer-specific losses 53 by means of triggerable layer-specific measuring parameters 521, . . . , 523/531, . . . , 533. The top-down table 7 comprises at least a bottom layer 721 and a top layer 72t providing upmost and lowermost layers of the risk transferred by the risk transfer layers 721, . . . , 72t. As a variant, the risk-transfer layer structure can be placed above an adjustable retention layer 76 associated with the risk-exposed components 21, . . . , 23 or the risk-transfer system 10, thus allowing a further optimization of the risk transferred.

In case of triggering an occurrence of a risk-event 52 based on the measured risk-event measuring parameters 521, . . . , 523/531, . . . , 53), the triggered risk-event 52 is assigned to the corresponding risk-transfer layer 721, . . . , 72t based on the start loss and stop loss layer threshold values 7211, . . . , 72t1/7212, . . . , 72t2. A loss 53 associated with the triggered risk event 52 is automatically covered based on the assigned risk-transfer segment 721, . . . , 72t by means of the pooled resources of the resource-pooling system 101.

If the triggered risk-event 52 is assignable to the top risk-transfer layer 72t, the cover is provided by either of the top layer 721 or bottom layer 721 providing a shared limit 75. i.e. aggregated limit, between the top layer 72t and the bottom layer 721. Further, in this case, a shared exhaustion factor 54 is generated based on the assigned risk-transfer layer 721,72t and based on the cover of the loss 53 associated with the triggered risk event 52. The shared exhaustion factor 54 is applied mutually to both layers, the bottom and top layer 721, 72t, eroding both layers by the same exhaustion factor (54), and wherein the top layer 72t and the bottom layer 72t are reinstatable by a corresponding generated reinstatement parameter value normalized over both layers 721, 72t and based on the shared limit 75 and the erosion of the top layer 72t and the bottom layer 72t.

Elsewise, i.e., if the triggered risk-event 52 is not assignable to the top risk-transfer layer 72t, the cover is provided based on the assigned corresponding risk-transfer layer 721, 722, . . . , 72i. Further, in this case, the exhaustion factor 54 is generated based on the assigned risk-transfer layer 721, . . . , 72i and based on the cover of the loss 53 associated with the triggered risk event 52. The generated exhaustion factor 54 is applied to the assigned layer 721, . . . , 72i eroding only the assigned layer 721, . . . , 72i by the generated exhaustion factor 54. The assigned layer 721, . . . , 72i is reinstatable by a corresponding generated reinstatement parameter value based on the erosion of the assigned layer 721, . . . , 72i. For example, the reinstatement parameters 561, . . . , 563 can be generated dependent upon the erosion of either the top and bottom layer 721,72t as a function of the proportion of the erosion, if the triggered risk-event 52 is assignable to either of the top risk-transfer layer 72t or the bottom risk-transfer layer 721.

As described above, if the lower risk-transfer layer 721 is partially eroded by means of the generated exhaustion factor 54, the top risk-transfer layer 72t is eroded by same proportion, whereas if the upper risk-transfer layer 72t is partially eroded by means of the generated exhaustion factor 54, the lower risk-transfer layer 721 is utilized until a recovery from the top layer 72t exceeds the shared limit 55 of the bottom layer 721 less the reinstatement premium parameters 561, . . . , 563, factoring in remaining limit.

As variant, the recovery can be automatically maximized by means of the system 1 by ordering occurring, measured and triggered events 52 in a descending order, providing an optimized risk-transfer structure for a total maximum recovery from multiple events 52 in the same time period and a minimum of reinstatement parameter values. In another variant, the recovery ca be assignable by a user, e.g. using dedicated interface means, by ordering events 52 in a user-specific order, providing a user-specific risk-transfer structure for a total maximum recovery from multiple events 52 in the same time period.

It is to be noted, that the present system 1 can be realized that a triggered occurrence of a loss associated with a predefined risk event is distinctively and automatically covered by means of the pooled resources and automatically generated signal transfer between the risk-transfer unit 10 and the connected resource-pooling system 101.

The present invention can be applied to automated risk-transfer structures, allowing automated risk transfer between the risk-exposed components 21, . . . , 23, as insured units to a risk-transfer unit 10 as primary insurer system, however, an also be applied for risk-transfer between automated insurance system as risk-exposed components 21, . . . , 23 and an automated reinsurance system as risk-transfer unit 10, or even be applied to both, i.e. risk/transfer between risk-exposed units 21, . . . , 23 as insured units or individuals, and, the risk-transfer between a risk-transfer unit 10 as automated primary insurance system and a second risk-transfer unit 12, as automated reinsurance or secondary insurance system. For example, the risk exposure components 21, 22, 23 can be realized as automated first insurance systems and the risk-transfer unit 10 can be realized as an automated reinsurance system, wherein a portion of the risk accumulated by an automated first insurance system is transferred to the automated reinsurance system by system 1 and captured by the risk transfer layers 721, 722, ..., 72i, ..., 72t, and wherein a portion of the risk is retained and assigned to a retention layer of the automated first insurance system. In this case, the risk-transfer system 1 can also comprise an automated secondary risk-transfer unit 1), wherein the risk-transfer unit 10 is connected to a second resource-pooling system 121 of the secondary risk-transfer unit 12 by means of a second payment-transfer module 42 configured for receiving and storing payments from the resource-pooling system 101 of the risk-transfer unit 10 for the transfer of risks associated with the pooled risks 50 of the risk exposure components 21, 22, 23, 24 from the primary risk-transfer unit 10 to the secondary risk-transfer unit 12, and wherein the automated resource-pooling systems 101, 121 as technical devices are coupled, steered and operated by means of an event-triggered switching device 11 of the system 1. In another example, the risk-transfer unit 10 can be realized as an automated first insurance system and the risk exposure components 21, 22, 23 represent insured units of the first insurance system, wherein the system 1 provides the automated risk-transfer between the risk exposure components 21, 22, 23 and the risk-transfer unit 10.

In the first case, mentioned above, the risk-transfer system 1 can e.g. comprise a seamless risk transfer operation 73 provided by the structure 74 of risk transfer segments 721, 722, 723 of the top-down table 7 by means of an assembly module 5. The risk exposure of the first risk-transfer system 10 associated with the risk transfer layers 721, ..., 72t of the top-down table 7 is transferred to the secondary risk-transfer system 12 by means of the risk transfer operation 73. By means of a core engine 3 of the trigger device 11, a payment parameter 731, ..., 73t can e.g. be assigned to each risk transfer layer 721, ..., 72t of the top-down table 7 and accumulated over all risk transfer layer 721, ..., 72t to a total payment sum, wherein the switching device 11 comprises a capturing device 111 for capturing payment transfer parameters 731, ..., 73t from the first payment-transfer module 41 to the second payment-transfer module 42. Upon triggering a transfer of the total payment sum at the second payment-transfer module 42, the risk exposure of the primary risk-transfer system 10 associated with the risk transfer layers 721, ..., 72t is transferred to the secondary risk-transfer system 12 based on the risk transfer structure 74 provided by means of the assigned start loss segment threshold values 7211, ..., 7211 and stop loss segment threshold values 7212, ..., 72t2. The core engine 3 comprises event-driven triggers 31, 32 for the triggering, in a data flow pathway 213, 223, 233, of measuring devices 215, 225, 235 associated with the risk exposure components 21, 22, 23 for the occurrence of a risk event. The triggers 31, 32 trigger for the occurrence of predefined risk events or stages of the impact of predefined risk events by means of the measuring devices 215, 225, 235. In case of a triggering of an occurrence of a risk event in the data flow pathway 9, the corresponding risk-transfer layer 721, ..., 72t is determined within the top-down table 7 by means of the core engine 3 based on the measured actual loss. In case of the occurrence of a risk event, an activation signal is generated by means of the trigger device 11 based on the determined risk-transfer layer 721, ..., 72t and the measured actual loss, wherein the switching device 11 triggers the complementary activation of the first and second resource-pooling system 101, 121 by means of the generated activation signal by transferring the activation to the first and/or second resource pooling system 101, 121 to provide risk protection to the risk exposure components 21, 22, 23. The activation of the first and/or second resource pooling system 101, 121 is based on the risk transfer operation 73 the assigned start loss segment threshold values 7211, ..., 72t1 and stop loss segment threshold values 7212, ..., 72t2 providing threshold values for the complementary switching and activation. By means of the generated activation signal based on the determined risk-transfer layer 721, ..., 72t of the top-down table 7, a corresponding trigger-flag, is activated by means of the resource-pooling system 10, and a parametric transfer of payment is assigned to this corresponding trigger-flag and a loss associated with the occurrence of a risk event is distinctly covered based on the respective trigger-flag.

As mentioned above, the inventive system allows for an optimized risk transfer structure designed to provide efficient capital adequacy and leveraged capacity, for example from an A.M. Best (A.M. Best Co. rating system) rating and estimating perspective, and/or supply increased earnings protection for non-industry events. The optimized risk-transfer structure of the present invention further allows to control and avoid negative rating actions from A.M. Best under new BCAR methodology, especially in the calculation of Catastrophe PMLs (probable maximum loss) or AAL (annual average loss) at higher VaR (Value at Risk) confidence levels. It further allows to evade operator's or investor's surprises when incurring a non-industry loss. The structure of the present invention allows to automatically address both: preserves capital in the case of a large event or provides earnings protection for small- to medium-sized events. The present invention also allows to determine and optimize natural risk break points as well as the mentioned probable maximum loss (PML) and AAL estimates. The invention further allows to assess a new risk-transfer by optimizing the layer structure of this new risk-transfer against its entire portfolio of transferred risks by monitoring how this new risk-transfer impacts its portfolio exposures and aggregations. The present invention allows for providing a shared limit between a top risk-transfer segment or layer (large event) and a bottom risk-transfer segment or layer (small- to medium-sized event). For all events, the cover provides a recovery from either layer (and for the same event, from only one layer). If either segment or layer is partially eroded, the other position is eroded by the same proportion. Similarly, reinstatement premium factors are dependent upon the erosion of either layer. Due to this, each layer can be realized to have independently the same cost. For Best's Capital Adequacy Ratio (BCAR) estimation purposes: the layer that reduces the required PML the most is the one that's used—generally the upper layer.

Table 1 gives 4 scenarios example: If lower layer is partially eroded, top layer is eroded by same proportion (see Scenario 3 below). If upper layer is partially eroded, lower layer is utilized until the recovery from the top layer exceeds the limit of the lower layer less the reinstatement premium, factoring in remaining limit (see Scenario 4 below—Upper Layer: 100 m×100 m, Lower Layer: 10×10).

TABLE 1

| Scenarios | Gross loss | Transferred loss | Retained loss | Lower limit of remaining limit | Upper limit of remaining limit |
| --- | --- | --- | --- | --- | --- |
| 1 | 50 m | 40 m | 10 m | 0 | 0 |
| 2 | 200 m | 180 m | 20 m | 0 | 0 |
| 3 | 15 m | 5 m | 10 m | 5 m | 50 m |
| 4 | 125 m | 105 m | 20 m | 7.5 m | 75 m |

To show the technical structure of the automated system, the following 7 examples may clarify the technical interaction of the layered operation by showing the appropriate output control parameters. The examples are based on the details, as given in table 2 below:

TABLE 2

| Details | | |
|---|---|---|
| Premium Parameter | 3.50 | |
| Reinstatements Parameter | 1.00 | @100% |
| Upper Layer | 100 xs 100 | |
| Lower Layer | 10 xs 10 | |

Table 3 shows example 1 with no measured loss event and the measured parameters as given below:

TABLE 3

| Example 1 - No Loss | | |
|---|---|---|
| Upfront Premium | | 3.50 |
| Reinstatements Premium | | 0.00 |
| Loss Payments | Event Size | Recoveries |
| Event 1 | 0.00 | 0.00 |
| Event 2 | 0.00 | 0.00 |
| Event 3 | 0.00 | 0.00 |
| Event 4 | 0.00 | 0.00 |
| Event 5 | 0.00 | 0.00 |

Table 4 shows example 2 with a measured small loss event and the operational parameters as given below:

TABLE 4

| Example 2 - Small Loss | | |
|---|---|---|
| Upfront Premium | | 3.50 |
| Reinstatements Premium | | 3.50 |
| Loss Payments | Event Size | Recoveries |
| Event 1 | 20.00 | 10.00 |
| Event 2 | 0.00 | 0.00 |
| Event 3 | 0.00 | 0.00 |
| Event 4 | 0.00 | 0.00 |
| Event 5 | 0.00 | 0.00 |

Table 5 shows example 3 with a measured large loss event and the operational parameters as given below:

TABLE 5

| Example 3 - Large Loss Event | | |
|---|---|---|
| Upfront Premium | | 3.50 |
| Reinstatements Premium | | 3.50 |
| Loss Payments | Event Size | Recoveries |
| Event 1 | 200.00 | 100.00 |
| Event 2 | 0.00 | 0.00 |
| Event 3 | 0.00 | 0.00 |
| Event 4 | 0.00 | 0.00 |
| Event 5 | 0.00 | 0.00 |

Table 6 shows example 4 with a measured half large loss event with the operational parameters as given below:

TABLE 6

| Example 4 - No Loss | | |
|---|---|---|
| Upfront Premium | | 3.50 |
| Reinstatements Premium | | 1.75 |
| Loss Payments | Event Size | Recoveries |
| Event 1 | 150.00 | 50.00 |
| Event 2 | 0.00 | 0.00 |
| Event 3 | 0.00 | 0.00 |
| Event 4 | 0.00 | 0.00 |
| Event 5 | 0.00 | 0.00 |

Table 7 shows example 5 with 2 times a measured half large loss event and 3 times measured small loss events with the operational parameters as given below:

TABLE 7

| Example 5 - 2 × Half Large Event + 3 Small Events | | |
|---|---|---|
| Upfront Premium | | 3.50 |
| Reinstatements Premium | | 3.50 |
| Loss Payments | Event Size | Recoveries |
| Event 1 | 150.00 | 50.00 |
| Event 2 | 150.00 | 50.00 |
| Event 3 | 20.00 | 10.00 |
| Event 4 | 20.00 | 0.00 |
| Event 5 | 20.00 | 0.00 |

Table 8 shows example 6 with 5 times measured half small loss events with the operational parameters as given below:

Example 6—No Loss

TABLE 8

| Example 6 - No Loss | | |
|---|---|---|
| Upfront Premium | | 3.50 |
| Reinstatements Premium | | 3.50 |
| Loss Payments | Event Size | Recoveries |
| Event 1 | 15.00 | 5.00 |
| Event 2 | 15.00 | 5.00 |
| Event 3 | 15.00 | 5.00 |
| Event 4 | 15.00 | 5.00 |
| Event 5 | 15.00 | 0.00 |

Table 9 shows example 7 with a measured half large event and a measured 11 m event with the operational parameters as given below:

TABLE 9

| Example 7 - No Loss | | |
|---|---|---|
| Upfront Premium | | 3.50 |
| Reinstatements Premium | | 2.10 |
| Loss Payments | Event Size | Recoveries |
| Event 1 | 150.00 | 50.00 |
| Event 2 | 11.00 | 1.00 |
| Event 3 | 0.00 | 5.00 |
| Event 4 | 0.00 | 0.00 |
| Event 5 | 0.00 | 0.00 |

The invention also allows to provide cover on a multi-year basis or on a partially contingent basis. In summary, the inventive system allows to provide efficient capital relief from an A.M. Best perspective and/or supply increased earnings protection from non-industry events. The system allows a much more efficient risk-transfer structure than comparable risk transfer structures of prior art systems, performing each risk-transfer layer, separately, in particular: (i) Reduced Expected Loss: Only recovers from one of the two layers in the same event, (ii) "Sharing" of NATCAT Capacity: per event exposure is less than if two separate layers; and (iii) Minimum ROL Efficiency: Similar to the Top'n'Drop concept, the minimum rate-on-line (ROL) charge is better used by increasing risk (EL) in the structure.

In an embodiment variant, the segment values 511, 512, 51*t* of the risk transfer layers 721, . . . , 72*t* are self-adapted by means of the system 1, thereby optimizing the resulting risk transfer operation 73. However, the optimization can also be performed by dedicated external means, as automated expert systems. The system 1 and/or the dedicated external means can e.g. operate the optimization until a local or global maximum or minimum, respectively, is achieved, or until a predefined target value is achieved. Finally, the optimization can be based on different sets of optimization criteria or by a specific selection a certain set of optimization criteria. As a condition for optimization, it is clear that the risk transfer structure 74 and the assigned risk transfer operation 73 should be related to the risk assumed or predicted, and preferable, if the risk assessment is correct, with the occurrence of the corresponding risk events within the defined time frame.

LIST OF REFERENCE SIGNS

1 System for providing optimized risk protection of risk exposure components
10 Risk-transfer unit
  101 First resource-pooling system
    1011 Segmentation layer of bottom risk contribution
    1012 Segmentation layer of second risk contribution
    1013 Segmentation layer of third risk contribution
    101*i* Segmentation layer of i-th risk contribution
    101*t* Segmentation layer of top risk contribution
11 Switching device
  111 Capturing device
12 Secondary risk-transfer system
  121 First resource-pooling system
21, 22, 23, 24 Risk exposure component
  211, 221, 231 Risk-related component data
  212, 222, 232 Likelihood of risk exposure of the pooled risk exposure components
  213, 223, 233 Interface to data flow pathway
  214, 224, 234 Stored payment parameters
  215, 225, 235 Measuring devices
3 Core engine
  30 Operating module
  31, 32 Risk event triggers
41 First payment transfer module
42 Second payment transfer module
5 Assembly module
  50 Total Risk
    511 Segmentation layer of bottom risk contribution
    512 Segmentation layer of second risk contribution
    513 Segmentation layer of third risk contribution
    51*i* Segmentation layer of i-th risk contribution
    51*t* Segmentation layer of top risk contribution
  51 Calculation engine of the assembly module
  52 Layer-specific risk events
    521, . . . , 523 Measuring parameters defining the layer-specific risk events
  53 Layer-specific losses
    531, . . . , 533 Measuring parameters defining layer-specific losses
  54 Exhaustion factor
  55 Reinstatement
    551, . . . , 553 Reinstatement parameter
61 First payment data store
62 Second payment data store
7 Top-down table with variable risk transfer layer
  711, 712, 713 Data structures for storing variable risk transfer layers
  721, 722, 723, . . . , 72*i*, . . . , 72*t* Adjustable risk transfer layer
  (721 Bottom layer; 721 i-th layer: 72*t* top layer)
    7211, . . . , 72*t*11 Start loss layer threshold value
    7212, . . . , 72*t*2 Stop loss layer threshold value
  731, 732, 733 Payment parameter assigned to each of the segments
  73 Adaptable risk transfer function
  74 Structure of risk transfer layer providing risk transfer function
  75 Shared limit
  76 Retention Layer
8 Monitoring module
9 Data flow pathway of measuring devices
  91 Network

The invention claimed is:

1. A layered, automated, adaptive risk-transfer system with an increased, self-optimizing leveraged capacity and enhanced drop-down cover structure comprising:
  circuitry configured to implement
  a first risk-transfer unit providing an optimized, self-sufficient risk protection for a variable number of risk exposure components;
  a first automated resource-pooling system associated with the first risk-transfer unit;
  interfaces connecting the risk exposure components to the resource-pooling system, the interfaces including a plurality of first payment-transfer modules configured for receiving and storing payments based upon transferred payment transfer parameters from the risk exposure components for the pooling of their risks, and wherein a triggered occurrence of a loss associated with a predefined risk event is distinctively and automatically covered by the pooled resources, wherein the first automated resource-pooling system is coupled to a second automated resource-pooling system associated with a second risk-transfer unit by an event-triggered trigger device, and wherein the first and second automated resource-pooling systems are coupled, steered, and operated by the event-triggered trigger device by generating and transmitting appropriate steering signals to the first and second automated resource-pooling systems; and
  a trigger device storing a top-down table providing data structures for storing a plurality of adjustable risk transfer layers, each risk transfer layer comprising an assigned start loss layer threshold value and stop loss layer threshold value providing a measure for a defined risk-transfer portion segmented from the risk-transfer continuum of the pooled risk and providing classifiable measurability for layer-specific risk events and/or layer-specific losses by triggerable layer-specific measuring parameters, wherein the top-down table comprises at least a bottom layer and a top layer providing upmost and lowermost layers of the risk transferred by the risk transfer layers, event-driven triggers triggering, in a data flow pathway, component-specific measuring devices associated with the risk exposure components for occurrence of predefined risk events, wherein the data flow pathway is dynamically monitored by the component-specific measuring devices connected to the data flow pathway via interfaces periodically or within predefined time periods, and wherein measuring parameters transmitted from the associated component-specific measuring devices are dynamically recorded by the event-driven triggers, wherein, in case of triggering an occurrence of a risk-event based on measured risk-event measuring parameters, the triggered risk-event is assigned to the corresponding risk-transfer layer based on the start loss and stop loss layer threshold values of measured risk-event assigning large loss events to a top risk-transfer layer and small to medium size loss events to a bottom risk-transfer layer, wherein a loss associated with the triggered risk event is automatically covered based on the assigned risk-transfer layer by the pooled resources of the resource-pooling system, wherein, if the triggered risk-event is assignable to the top risk-transfer layer, the cover is provided by either of the top layer or bottom layer providing a shared limit between the top layer and the bottom layer, and wherein otherwise the cover is provided based on the assigned corresponding risk-transfer layer, wherein, if the triggered risk-event is assignable to either of the top risk-transfer layer or the bottom risk-transfer layer, a shared exhaustion factor is generated based on the assigned risk-transfer layer and based on the cover of the loss associated with the triggered risk event, wherein the shared exhaustion factor is applied mutually to both layers, the bottom and top layer, eroding both layers by the same exhaustion factor, and wherein the top layer and the bottom layer are reinstatable by a corresponding generated reinstatement parameter value normalized over both layers and based on the shared limit and the erosion of the top layer and the bottom layer, wherein, if the triggered risk-event is not assignable to the top risk-transfer layer, the exhaustion factor is generated based on the assigned risk-transfer layer and based on the cover of the loss associated with the triggered risk event, wherein the generated exhaustion factor is applied to the assigned layer eroding only the assigned layer by the generated exhaustion factor, and wherein the assigned layer is reinstatable by a corresponding generated reinstatement parameter value based on the erosion of the assigned layer, and wherein in case of the occurrence of the risk event, an activation signal is generated by the event-triggered trigger device based on the determined risk-transfer layer and the measured actual loss, wherein the event-triggered trigger device triggers complementary activation of the first and second automated resource-pooling systems by the generated activation signal by transferring the activation to the first and/or automated second resource-pooling system to provide automated risk protection to the risk exposure components, wherein the activation of the first and/or second automated resource-pooling system is based on a risk transfer operation, the assigned start loss layer threshold values, and the stop loss layer threshold values providing threshold values for the complementary switching and activation, and wherein by the generated activation signal based on the determined risk-transfer layer of the top-down table, a corresponding trigger-flag is activated by the resource-pooling system, and a parametric transfer of payment is assigned to the corresponding trigger-flag and a loss associated with the occurrence of a risk event is distinctly covered based on the respective trigger-flag.

2. The automated risk-transfer system according to claim 1, wherein the circuitry is configured to generate the reinstatement parameters dependent upon the erosion of either the top and bottom layer as a function of the proportion of the erosion, if the triggered risk-event is assignable to either of the top risk-transfer layer or the bottom risk-transfer layer.

3. The automated risk-transfer system according to claim 1, wherein the circuitry is configured such that if a lower risk-transfer layer is partially eroded by the generated exhaustion factor, the top risk-transfer layer is eroded by same proportion, whereas if the upper risk-transfer layer is partially eroded by the generated exhaustion factor, the lower risk-transfer layer is utilized until a recovery from the top layer exceeds the shared limit of the lower layer less the reinstatement premium parameters, factoring in remaining limit.

4. The automated risk-transfer system according to claim 1, wherein the circuitry is configured to automatically maximize the recovery by ordering events in a descending order, providing an optimized risk-transfer structure for a total maximum recovery from multiple events in the same time period and a minimum of reinstatement parameter values.

5. The automated risk-transfer system according to claim 1, wherein the circuitry is configured to assign the recovery by accepting, from a user, an ordering of events in a user-specific order, providing a user-specific risk-transfer structure for a total maximum recovery from multiple events in the same time period.

6. The automated risk-transfer system according to claim 1, wherein the circuitry is configured to distinctly and automatically cover a triggered occurrence of a loss associated with a predefined risk event by the pooled resources and automatically generated signal transfer between the first risk-transfer unit and the connected resource-pooling system.

7. The automated risk-transfer system according to claim 1, wherein the circuitry is configured to place the risk-transfer layer structure above an adjustable retention layer.

8. The automated risk-transfer system according to claim 1, wherein the risk exposure components are automated first insurance systems, and wherein the circuitry is configured such that the first risk-transfer unit is an automated reinsurance system, wherein a portion of the risk accumulated by an automated first insurance system is transferred to the automated reinsurance system by the circuitry and captured by the risk transfer layers, and wherein a portion of the risk is retained and assigned to a retention layer of the automated first insurance system.

9. The automated risk-transfer system according to claim 1, wherein the first risk-transfer unit is an automated first insurance system and the risk exposure components represent insured units of the first insurance system, wherein the circuitry provides the risk-transfer between the risk exposure components and the first risk-transfer unit.

10. The automated risk-transfer system according to claim 1, wherein the first automated resource-pooling system associated with the first risk-transfer unit is fully automated by generated electronic signaling and steering by the risk-transfer system and/or the first risk-transfer unit.

11. The automated risk-transfer system according to claim 1, wherein the first risk-transfer unit is connected to the second resource-pooling system of the second risk-transfer unit by a second payment-transfer module configured for receiving and storing payments from the resource-pooling system of the first risk-transfer unit for the transfer of risks associated with the pooled risks of the risk exposure components from the first risk-transfer unit to the second risk-transfer unit.

12. An automated risk-transfer method for a layered, automated risk-transfer system with an increased leveraged capacity and enhanced drop-down cover structure comprising:

implementing, by circuitry, a first risk-transfer unit providing an optimized, self-sufficient risk protection for a variable number of risk exposure components implementing, by the circuitry, a first automated resource-pooling system associated with the first risk-transfer unit;

implementing, by the circuitry, interfaces connecting the risk exposure components to the resource-pooling system, the interfaces comprising of a plurality of first payment-transfer modules configured for receiving and storing payments based upon transferred payment transfer parameters from the risk exposure components for the pooling of their risks, and wherein a triggered occurrence of a loss associated with a predefined risk event is distinctively and automatically covered by the pooled resources, wherein the first automated resource-pooling system is coupled to a second automated resource-pooling system associated with a second risk-transfer unit by an event-triggered trigger device, and wherein the first and second automated resource-pooling systems are coupled, steered, and operated by the event-triggered trigger device by generating and transmitting appropriate steering signals to the first and second automated resource-pooling systems;

implementing, by the circuitry, a trigger device storing a top-down table providing data structures for storing a plurality of adjustable risk transfer layers, each risk transfer layer comprising an assigned start loss layer threshold value and stop loss layer threshold value providing a measure for a defined risk-transfer portion segmented from the risk-transfer continuum of the pooled risk and providing classifiable measurability for layer-specific risk events and/or layer-specific losses by triggerable layer-specific measuring parameters, wherein the top-down table comprises at least a bottom layer and a top layer providing upmost and lowermost layers of the risk transferred by the risk transfer layers;

triggering, by event-driven triggers, in a data flow pathway, component-specific measuring devices associated with the risk exposure components for occurrence of predefined risk events, wherein the data flow pathway is dynamically monitored by the component-specific measuring devices connected to the data flow pathway via interfaces periodically or within predefined time periods, and wherein measuring parameters transmitted from the associated component-specific measuring devices are dynamically recorded by the event-driven triggers, in case of triggering an occurrence of a risk-event based on measured risk-event measuring parameters, assigning, by the circuitry, the triggered risk-event to the corresponding risk-transfer layer based on the start loss and stop loss layer threshold values of measured risk-event assigning large loss events to a top risk-transfer layer and small to medium size loss events to a bottom risk-transfer layer, wherein a loss associated with the triggered risk event is automatically covered based on the assigned risk-transfer layer by the pooled resources of the resource-pooling system, if the triggered risk-event is assignable to the top risk-transfer layer, providing the cover by the circuitry by either of the top layer or bottom layer providing a shared limit between the top layer and the bottom layer, and otherwise providing the cover based on the assigned corresponding risk-transfer layer, if the triggered risk-event is assignable to either of the top risk-transfer layer or the bottom risk-transfer layer, generating, by the circuitry, a shared exhaustion factor based on the assigned risk-transfer layer and based on the cover of the loss associated with the triggered risk event, and applying the shared exhaustion factor mutually to both layers, the bottom and top layer, eroding both layers by the same exhaustion factor, wherein the top layer and the bottom layer are reinstatable by a corresponding generated reinstatement parameter value normalized over both layers and based on the shared limit and the erosion of the top layer and the bottom layer, if the triggered risk-event is not assignable to the top risk-transfer layer, generating the exhaustion factor by the circuitry based on the assigned risk-transfer layer and based on the cover of the loss associated with the triggered risk event and applying the generated exhaustion factor to the assigned layer eroding only the assigned layer by the generated exhaustion factor, wherein the assigned layer is reinstatable by a corresponding generated reinstatement parameter value based on the erosion of the assigned layer, and in case of triggering the occurrence of a risk event, an activation signal is generated by the event-triggered trigger device based on the determined risk-transfer layer and the measured actual loss, wherein the event-triggered trigger device triggers complementary activation of the first and second automated resource-pooling systems by the generated activation signal by transferring the activation to the first and/or automated second resource-pooling system to provide automated risk protection to the risk exposure components, wherein the activation of the first and/or second automated resource-pooling system is based on a risk transfer operation, the assigned start loss layer threshold values, and the stop loss layer threshold values providing threshold values for the complementary switching and activation, and wherein by the generated activation signal based on the determined risk-transfer layer of the top-down table, a corresponding trigger-flag is activated by the resource-pooling system, and a parametric transfer of payment is assigned to the corresponding trigger-flag and a loss associated with the occurrence of a risk event is distinctly covered based on the respective trigger-flag.

* * * * *